United States Patent
Loehr et al.

(10) Patent No.: US 12,557,138 B2
(45) Date of Patent: Feb. 17, 2026

(54) INCREMENTING A TRANSMISSION COUNTER IN RESPONSE TO LBT FAILURE

(71) Applicant: Lenovo (Singapore) PTE. LTD., New Tech Park (SG)

(72) Inventors: Joachim Loehr, Wiesbaden (DE); Alexander Johann Maria Golitschek Edler von Elbwart, Darmstadt (DE); Ravi Kuchibhotla, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 574 days.

(21) Appl. No.: 17/996,869

(22) PCT Filed: Apr. 21, 2021

(86) PCT No.: PCT/IB2021/053300
§ 371 (c)(1),
(2) Date: Oct. 21, 2022

(87) PCT Pub. No.: WO2021/214689
PCT Pub. Date: Oct. 28, 2021

(65) Prior Publication Data
US 2023/0164834 A1 May 25, 2023

Related U.S. Application Data

(60) Provisional application No. 63/013,186, filed on Apr. 21, 2020.

(51) Int. Cl.
*H04W 74/0808* (2024.01)

(52) U.S. Cl.
CPC .............................. *H04W 74/0808* (2013.01)

(58) Field of Classification Search
CPC . H04W 74/0808; H04W 24/08; H04W 72/21; H04W 74/002
See application file for complete search history.

(56) References Cited

U.S. PATENT DOCUMENTS

| | | | |
|---|---|---|---|
| 10,979,128 B1* | 4/2021 | Babaei | H04B 7/0695 |
| 2020/0106573 A1* | 4/2020 | Cirik | H04W 74/0808 |
| 2021/0058833 A1* | 2/2021 | Basu Mallick | H04W 36/0055 |
| 2021/0144761 A1* | 5/2021 | Chin | H04W 74/0808 |

(Continued)

OTHER PUBLICATIONS

R2-1913260_-_On_consistent_LBT_failures (Year: 2019).*
(Continued)

*Primary Examiner* — Nizar N Sivji
(74) *Attorney, Agent, or Firm* — Kunzler Needham & Hilton

(57) ABSTRACT

Apparatuses, methods, and systems are disclosed for counter handling in case of LBT failure. One apparatus includes a transceiver and a processor that performs a Listen-Before-Talk ("LBT") procedure for a transmission and detects LBT failure for the transmission. The processor determines whether a medium access control ("MAC") entity of the apparatus is configured with a consistent LBT failure recovery procedure. The processor increments a transmission counter without transmission of an uplink transmission in response to an indication of the LBT failure and in response to MAC entity not being configured with the consistent LBT failure recovery procedure.

20 Claims, 12 Drawing Sheets

(56) References Cited

U.S. PATENT DOCUMENTS

| | | | | |
|---|---|---|---|---|
| 2021/0234601 A1* | 7/2021 | Awadin | ................ | H04L 5/0048 |
| 2021/0337592 A1* | 10/2021 | Kunt | ................ | H04W 74/0808 |
| 2022/0022252 A1* | 1/2022 | Lee | ...................... | H04W 24/08 |
| 2022/0030623 A1* | 1/2022 | Wang | ................... | H04W 24/08 |
| 2022/0070928 A1* | 3/2022 | Babaei | ............. | H04W 74/0808 |
| 2022/0167408 A1* | 5/2022 | Lee | ................... | H04W 74/0816 |
| 2022/0394763 A1* | 12/2022 | Wang | ............... | H04W 74/0808 |
| 2022/0400396 A1* | 12/2022 | Alfarhan | .......... | H04W 74/0808 |
| 2023/0156540 A1* | 5/2023 | Wang | ............ | H04W 36/00837 |
| | | | | 370/331 |
| 2023/0164828 A1* | 5/2023 | Uesaka | ............ | H04W 74/0816 |
| | | | | 370/329 |
| 2024/0276275 A1* | 8/2024 | Kumar | ............. | H04W 74/0833 |
| 2025/0024519 A1* | 1/2025 | Qiu | .................. | H04W 74/0833 |

OTHER PUBLICATIONS

R2-2002848_LBT_failures (Year: 2020).*

PCT/IB2021/053300, "Notification of Transmittal of the International Search Report and the Written Opinion of the International Searching authority, or the Declaration", International Searching Authority, Jul. 14, 2021, pp. 1-13.

Mediatek Inc. "On consistent LBT failures", 3GPP TSG-RAN WG2 Meeting #107bis R2-1913260, Oct. 14-18, 2019, pp. 1-5.

Qualcomm Incorporated, "Remaining critical issues for LBT failures", 3GPP TSG-RAN2 #109bis-e R2-2002848, Apr. 20-30, 2020, pp. 1-4.

3GPP, "3rd Generation Partnership Project; Technical Specification Group Radio Access Network; NR; Medium Access Control (MAC) protocol specification (Release 16)", 3GPP TS 38.321 V16.0.0, Mar. 2020, pp. 1-141.

* cited by examiner

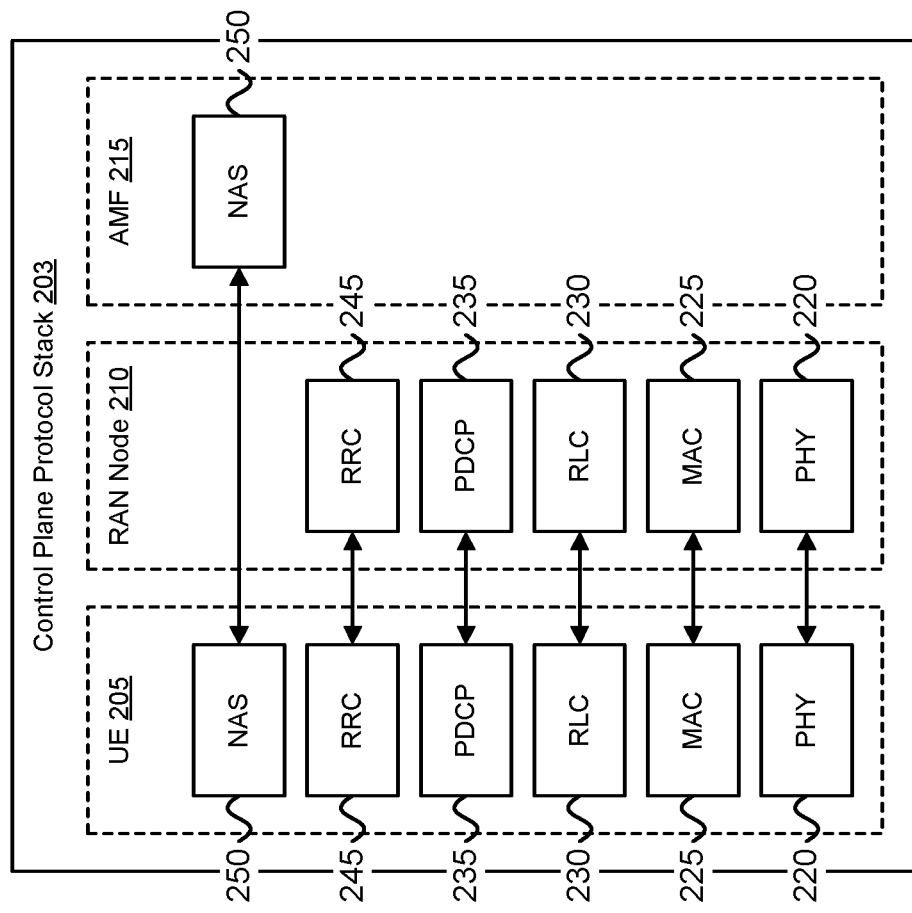
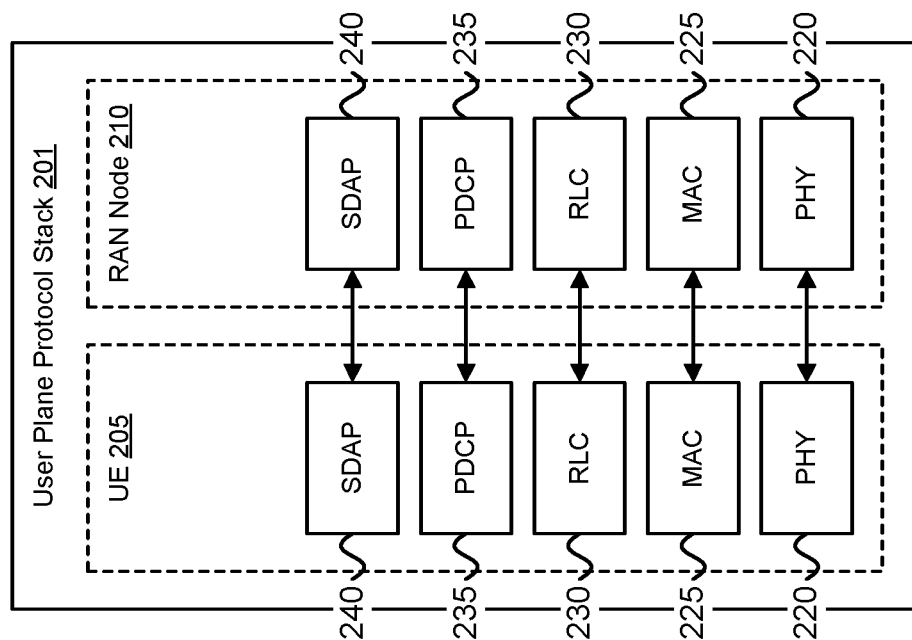
FIG. 2

5.1.3 Random Access Preamble transmission

The MAC entity shall, for each Random Access Preamble:

1>     if *PREAMBLE_TRANSMISSION_COUNTER* is greater than one; and

1>     if the notification of suspending power ramping counter has not been received from lower layers; and 1>     if LBT failure indication was not received from lower layers for the last Random Access Preamble transmission; and 1>     if SSB or CSI-RS selected is not changed from the selection in the last Random Access Preamble transmission:

2>    increment *PREAMBLE_POWER_RAMPING_COUNTER* by 1.    — 705

1>     **if *PREAMBLE_TRANSMISSION_COUNTER* is greater than one; and**

2> if LBT failure indication is received from lower layers for last Random Access Preamble transmission:

3>    if UE does not support the consistent LBT failure recovery procedure or the MAC entity is not configured with a consistent LBT failure recovery procedure

**4> increment *PREAMBLE_TRANSMISSION_COUNTER* by 1;**

1>     select the value of *DELTA_PREAMBLE* according to clause 7.3;

1>     set *PREAMBLE_RECEIVED_TARGET_POWER* to *preambleReceivedTargetPower* + *DELTA_PREAMBLE* + (*PREAMBLE_POWER_RAMPING_COUNTER* – 1) × *PREAMBLE_POWER_RAMPING_STEP* + *POWER_OFFSET_2STEP_RA*;

1>     except for contention-free Random Access Preamble for beam failure recovery request, compute the RA-RNTI associated with the PRACH occasion in which the Random Access Preamble is transmitted;

1>     instruct the physical layer to transmit the Random Access Preamble using the selected PRACH occasion, corresponding RA-RNTI (if available), *PREAMBLE_INDEX* and *PREAMBLE_RECEIVED_TARGET_POWER*.

1>     if LBT failure indication is received from lower layers for this Random Access Preamble transmission:

2>    perform the Random Access Resource selection procedure (see clause 5.1.2).

FIG. 7

INCREMENTING A TRANSMISSION COUNTER IN RESPONSE TO LBT FAILURE

CROSS-REFERENCE TO RELATED APPLICATIONS

This application claims priority to U.S. Provisional Patent Application No. 63/013,186 entitled "RACH/SR COUNTER HANDLING IN CASE OF LBT FAILURE" and filed on Apr. 21, 2020 for Joachim Loehr, Alexander Johann Maria Golitschek Edler von Elbwart, and Ravi Kuchibhotla, which application is incorporated herein by reference.

FIELD

The subject matter disclosed herein relates generally to wireless communications and more particularly relates to handling consistent Listen-Before-Talk ("LBT") failure for the case of spatial multiplexed communications.

BACKGROUND

In certain wireless communication systems, service is supplemented by operation on unlicensed spectrum. However, operation on unlicensed spectrum requires Clear Channel Assessment ("CCA") prior to transmission, for example involving a Listen-Before-Talk ("LBT") procedure.

In Third generation Partnership Project ("3GPP") New Radio in Unlicensed Spectrum ("NR-U"), channel access in both downlink ("DL") and uplink ("UL") relies on the CCA (e.g., LBT procedure) to gain channel access. Prior to any transmission, the gNB (i.e., 5th generation ("5G") base station) and/or the User Equipment ("UE") must first sense the channel to find out whether there are ongoing communications on the channel No beamforming is considered for LBT in NR-U in Release 16 ("Rel-16") and only omni-directional LBT is assumed.

BRIEF SUMMARY

Disclosed are procedures for counter handling in case of LBT failure. Said procedures may be implemented by apparatus, systems, methods, or computer program products.

One method of a User Equipment device ("UE") includes performing a Listen-Before-Talk ("LBT") procedure for a transmission and detecting LBT failure for the transmission. The first method includes determining whether a Medium Access Control ("MAC") entity of the UE is configured with a consistent LBT failure recovery procedure. If the MAC entity of the UE is not configured with the consistent LBT failure recovery procedure, the first method includes incrementing a transmission counter without transmission of an uplink transmission in response to an indication of the LBT failure.

Another method of a UE includes performing a LBT procedure for a transmission and detecting LBT failure for the transmission. The second method includes determining whether consistent LBT failure recovery functionality is supported at the UE. If the UE does not support consistent LBT failure recovery functionality, the second method includes indicating an LBT success by to a MAC entity of the UE without performing a corresponding uplink transmission in response to the LBT failure.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2 is a block diagram illustrating one embodiment of a 5G New Radio ("NR") protocol stack;

FIG. 7 is a diagram illustrating one embodiment of an implementation of RACH counter handling in case of LBT failure;

DETAILED DESCRIPTION

Figure 1:
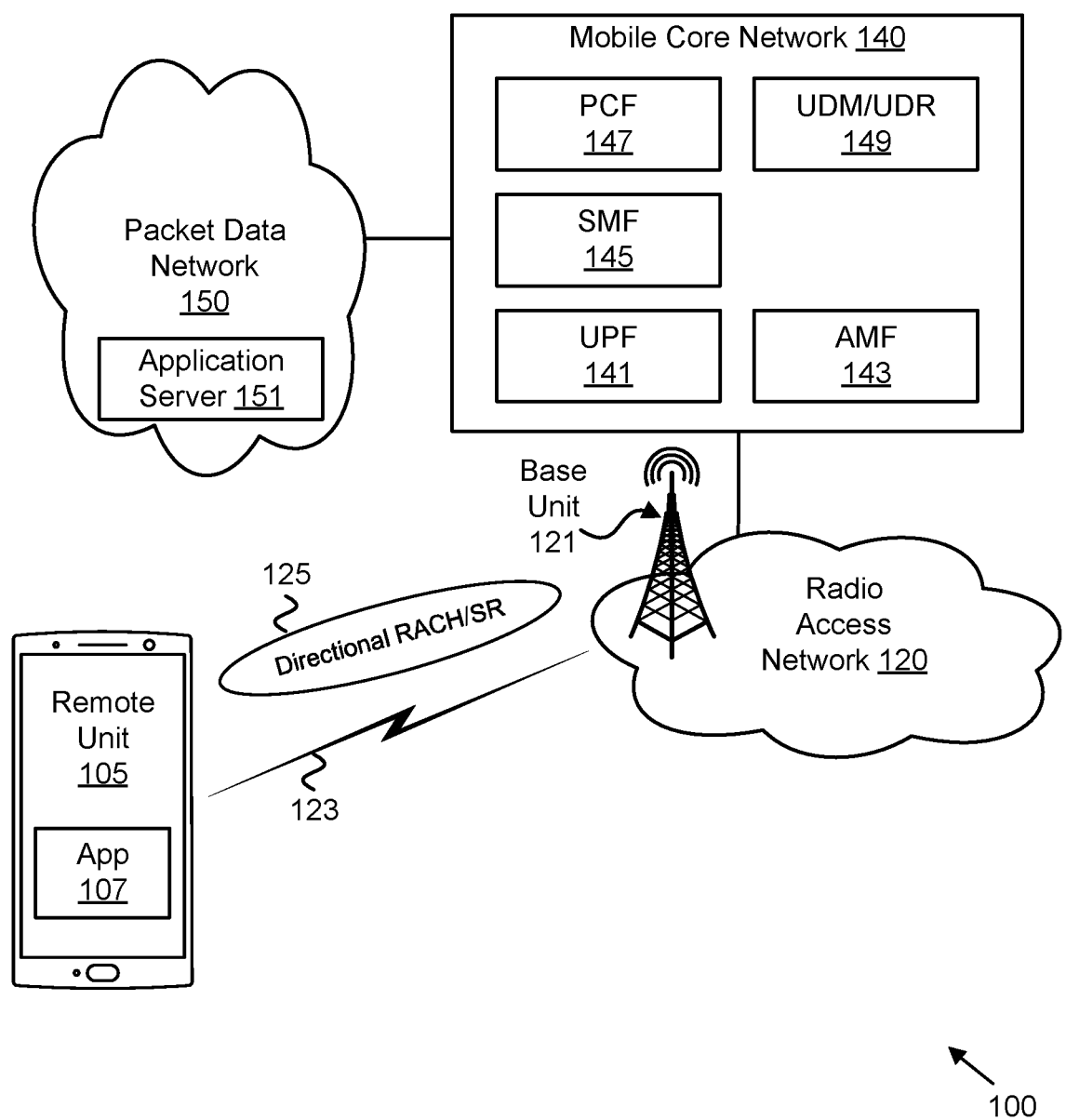
FIG. 1 is a schematic block diagram illustrating one embodiment of a wireless communication system for counter handling in case of LBT failure.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for counter handling in case of Listen-Before-Talk ("LBT") failure. In NR-U, channel access in both downlink and uplink relies on the LBT; however, no beamforming is considered for LBT in NR-U in Rel-16 and only omni-directional LBT is assumed. A MAC layer entity of the UE relies on reception of a notification of UL LBT failure from the Physical layer to detect a consistent UL LBT failure. The NR-U LBT procedures for channel access can be summarized as follows:

A) Both gNB-initiated and UE-initiated Channel Occupant Times ("COTs") use Category 4 ("Cat-4") LBT where the start of a new transmission burst always perform LBT with exponential back-off. Only with exception, when the DRS must be at most one ms in duration and is not multiplexed with unicast PDSCH. As used herein, a Cat-4 LBT procedure refers to LBT with a random back-off and with a variable size contention window.

B) UL transmission within a gNB initiated Channel Occupancy Time ("COT") or a subsequent DL transmission within a UE or gNB initiated COT can transmit immediately without sensing only if the gap from the end of the previous transmission is not more than 16 µs, otherwise Category 2 ("Cat-2") LBT must be used, and the gap cannot exceed 25 µs. As used herein, a Cat-2 LBT procedure refers to LBT without random back-off.

According to 3GPP TS 38.321, the transmission counter PREAMBLE_POWER_RAMPING_COUNTER is to be incremented every time a new PRACH preamble is transmitted as long as the corresponding SSB or CSI-RS selected does not change and LBT failure has not occurred in the previous transmission. This last part ensures that the power ramping is not applied due to LBT failures.

A first problem addressed by the present disclosure relates to how to handle RACH counters when consistent LBT failures happen. According to the current specified behavior, the RACH counter PREAMBLE_TRANSMISSION_COUNTER will be stuck at the same value. In order to solve such deadlock situation, the consistent LBT detection and recovery procedure was introduced. However, the LBT failure detection and recovery is an optional UE capability/feature. Therefore, when the UE does not support this mechanism or the network does not configure the consistent LBT failure detection and recovery procedure, there will not be a recovery if RACH attempts fail consistently, i.e., the UE will not inform RRC layer about the RACH problem and trigger RLF, since counter never reaches the configured maximum value preambleTransMax.

A second problem addressed by the present disclosure relates to the transmission of Scheduling Request ("SR") on Physical Uplink Control Channel ("PUCCH"). In case of consistent LBT failure, the higher layer (e.g., RRC layer) is not informed about the link problem and random access procedure is not triggered, since the SR counter is not increased and hence sr-TransMax is not exceeded.

To solve the above problems with the current state of the art, the following UE behavior may be implemented:

UE behavior with respect to RACH counter handling depends on the UE capability and depends on whether the network configures the UE with consistent LBT failure recovery procedure. When the UE does not support the LBT detection and recovery functionality or when the UE is not configured with a consistent LBT failure recovery procedure, then the UE is to increment the RACH counter (e.g., PREAMBLE_TRANSMISSION_COUNTER) if the preamble is not transmitted due to LBT failure. However, for cases when the UE does support the consistent LBT failure recovery procedure and the UE MAC layer entity is configured by network with the consistent LBT failure recovery procedure, then the UE does not increment the RACH counter (e.g., PREAMBLE_TRANSMISSION_COUNTER) if the preamble is not transmitted due to LBT failure The UE behavior with respect to SR counter handling depends on the UE capability and depends on whether the network configures the UE with consistent LBT failure recovery procedure. When the UE does not support the LBT detection and recovery functionality or when the UE is not configured with a consistent LBT failure recovery procedure, then the UE is to increment the SR transmission counter (e.g., SR_COUNTER) if the preamble is not transmitted due to LBT failure. For cases when UE does support the consistent LBT failure recovery procedure and the UE/MAC is configured by network with the consistent LBT failure recovery procedure, the UE does not increment the SR_COUNTER if the preamble is not transmitted due to LBT failure In certain embodiments, the PHY layer of a UE indicates an LBT success to the MAC layer for cases when the consistent LBT failure recovery procedure is not used by the UE even for cases when the Random access preamble transmission cannot be performed due to LBT failure.

FIG. 1 depicts a wireless communication system 100 for counter handling in case of LBT failure, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the 5G system specified in the 3GPP specifications. For example, the RAN 120 may be a NG-RAN, implementing NR RAT and/or LTE RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 140. As described in greater detail below, the remote unit 105 may send directional RACH and/or SR transmissions 125 to the base unit 121.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR-U operation, the base unit 121 and the remote unit 105 communicate over unlicensed radio spectrum.

In one embodiment, the mobile core network 140 is a 5GC or an Evolved Packet Core ("EPC"), which may be coupled to a packet data network 150, like the Internet and private data networks, among other data networks. A remote unit 105 may have a subscription or other account with the mobile core network 140. Each mobile core network 140 belongs to a single PLMN. The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, and a Unified Data Management function ("UDM"). In some embodiments, the UDM is co-located with a User Data Repository ("UDR"), depicted as combined entity "UDM/UDR" 149. In various embodiments, the mobile core network 140 may also include an Authentication Server Function ("AUSF"), a Network Repository Function ("NRF") (used by the various NFs to discover and communicate with each other over Application Programming Interfaces ("APIs")), or other NFs defined for the 5GC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

While FIG. 1 depicts components of a 5G RAN and a 5G core network, the described embodiments for counter handling in case of LBT failure apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

In the following descriptions, the term "RAN node" is used for the base station but it is replaceable by any other radio access node, e.g., gNB, eNB, Base Station ("BS"), Access Point ("AP"), etc. Further, the operations are described mainly in the context of 5G NR. However, the proposed solutions/methods are also equally applicable to other mobile communication systems supporting counter handling in case of LBT failure.

FIG. 2 depicts a NR protocol stack 200, according to embodiments of the disclosure. While FIG. 2 shows the UE 205, the RAN node 210 and an AMF 215 in a 5G core network ("5GC"), these are representative of a set of remote units 105 interacting with a base unit 121 and a mobile core network 140. As depicted, the protocol stack 200 comprises a User Plane protocol stack 201 and a Control Plane protocol stack 203. The User Plane protocol stack 201 includes a physical ("PHY") layer 220, a Medium Access Control ("MAC") sublayer 225, the Radio Link Control ("RLC") sublayer 230, a Packet Data Convergence Protocol ("PDCP") sublayer 235, and Service Data Adaptation Protocol ("SDAP") layer 240. The Control Plane protocol stack 203 includes a physical layer 220, a MAC sublayer 225, a RLC sublayer 230, and a PDCP sublayer 235. The Control Plane protocol stack 203 also includes a Radio Resource Control ("RRC") layer 245 and a Non-Access Stratum ("NAS") layer 250.

The AS layer (also referred to as "AS protocol stack") for the User Plane protocol stack 201 consists of at least SDAP, PDCP, RLC and MAC sublayers, and the physical layer. The AS layer for the Control Plane protocol stack 203 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 245 and the NAS layer 250 for the control plane and includes, e.g., an Internet Protocol ("IP") layer and/or PDU Layer (not depicted) for the user plane. L1 and L2 are referred to as "lower layers," while L3 and above (e.g., transport layer, application layer) are referred to as "higher layers" or "upper layers."

The physical layer 220 offers transport channels to the MAC sublayer 225. The physical layer 220 may perform CCA/LBT procedure using energy detection thresholds, as described herein. In certain embodiments, the physical layer 220 may send a notification of UL LBT failure to a MAC entity at the MAC sublayer 225. The MAC sublayer 225 offers logical channels to the RLC sublayer 230. The RLC sublayer 230 offers RLC channels to the PDCP sublayer 235. The PDCP sublayer 235 offers radio bearers to the SDAP sublayer 240 and/or RRC layer 245. The SDAP sublayer 240 offers QoS flows to the core network (e.g., 5GC). The RRC layer 245 provides for the addition, modification, and release of Carrier Aggregation and/or Dual Connectivity. The RRC layer 245 also manages the establishment, configuration, maintenance, and release of Signaling Radio Bearers ("SRBs") and Data Radio Bearers ("DRBs").

The NAS layer 250 is between the UE 205 and the 5GC 215. NAS messages are passed transparently through the RAN. The NAS layer 250 is used to manage the establishment of communication sessions and for maintaining continuous communications with the UE 205 as it moves between different cells of the RAN. In contrast, the AS layer is between the UE 205 and the RAN (i.e., RAN node 210) and carries information over the wireless portion of the network.

A UE may use various transmission counters, including a RACH transmission counter and a SR transmission counter. One example of a RACH transmission counter is the PREAMBLE_TRANSMISSION_COUNTER which starts from 1 (at the first PRACH transmission) and gets incremented by 1 each time PRACH is retransmitted. As defined in 3GPP TS 38.321, PREAMBLE_TRANSMISSION_COUNTER is used to detect and declare RACH failure. It is incremented when a RA response is not received within ra-Response Window duration. When the counter reaches the configured maximum value (preambleTransMax+1), random access failure is declared and either RLF (on MCG) or SCG failure occurs.

Since ra-Response Window only starts with actual msg1 or msgA transmission, it is not started when these transmission fail due to LBT failures. Therefore, when consistent LBT failures happen, PREAMBLE_TRANSMISSION_COUNTER will be stuck at the same value. When RAN2 made the agreement on PREAMBLE_TRANSMISSION_COUNTER, it was assumed that consistent UL LBT failure detection and recovery mechanism will kick in and break the deadlock due to counter being stuck.

One example of a SR transmission counter is SR_COUNTER which also starts from 1 (at the first SR transmission) and gets incremented by 1 each time SR is retransmitted. SR_COUNTER may be used to detect and declare SR failure, e.g., where a maximum number of SR transmissions (i.e., sr-TransMax) has been reached.

The problems/issues mentioned above may be solved by making it mandatory that a remote unit 105 supports the consistent LBT failure recovery procedure. It should be also noted that the consistent LBT failure recovery procedure has been designed in a way that it is more efficient compared to the legacy RLF procedure, i.e., RLF may be triggered too early when relying on the legacy procedures which are not optimized for NR-U/LBT. However, even the mandatory support/capability may not be sufficient, as also the network needs to support and configure it. Therefore, the following solutions describe counter handling in the case of LBT failure that considers a UE's ability to support the consistent LBT failure recovery procedure.

Figure 3:
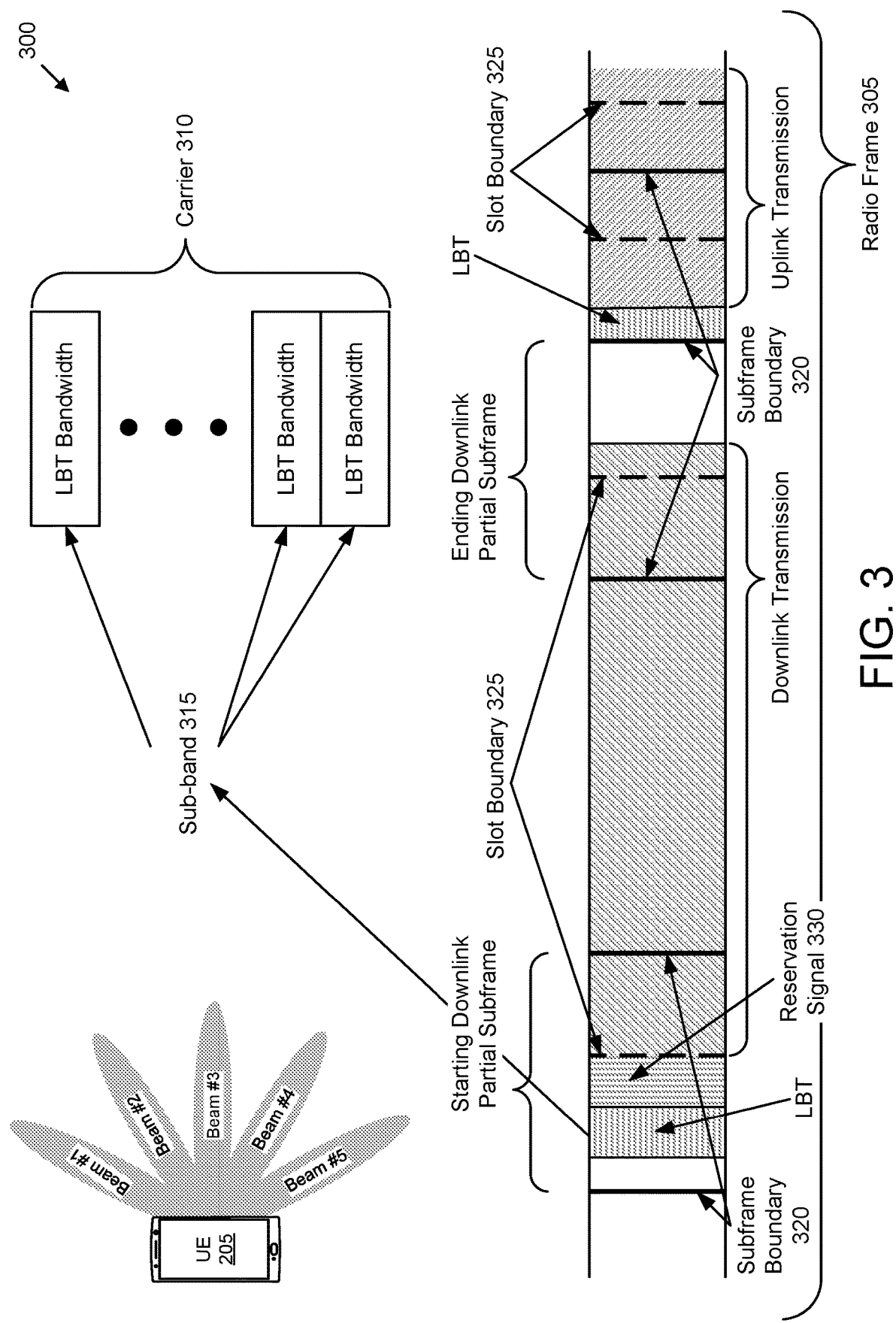
FIG. 3 is a diagram illustrating one embodiment of a radio frame during which LBT procedure is performed.

FIG. 3 depicts an LBT procedure 300 for a radio frame 305 for unlicensed communication, according to embodiments of the disclosure. When a communication channel is a wide bandwidth unlicensed carrier 310 (e.g., several hundred MHz, the CCA/LBT procedure relies on detecting the energy level on multiple sub-bands 315 of the communications channel as shown in FIG. 3. The LBT parameters (such as type/duration, clear channel assessment parameters, etc.) may be configured in the UE 205 by the RAN node 210. In one embodiment, the LBT procedure is performed at the PHY layer 220.

When performing omni-directional LBT, the entity (i.e., UE or RAN node) may use an omnidirectional sensing beam. Alternatively, the entity may simultaneously perform directional LBT using multiple beams (i.e., corresponding to multiple device panels) in order to simulate omnidirectional sensing. When performing directional LBT, the entity (i.e., UE or RAN node) performs LBT for a given beam (i.e., corresponding to a given spatial direction). Note that each directional beam may correspond to one or more device panels.

FIG. 3 also depicts frame structure of the radio frame 305 for unlicensed communication between the UE 205 and RAN node 210. The radio frame 305 may be divided into subframes (indicated by subframe boundaries 320) and may be further divided into slots (indicated by slot boundaries 325). The radio frame 305 uses a flexible arrangements where uplink and downlink operations are on the same frequency channel but are separated in time. However, the subframes are not configured as a downlink subframe or an uplink subframe and a particular subframe may be used by either the UE 205 or RAN node 210. As discussed previously, LBT is performed prior to a transmission. Where LBT does not coincide with a slot boundary 325, a reservation signal 330 may be transmitted to reserve (i.e., occupy) the channel until the slot boundary is reached and data transmission begins.

Figure 4:
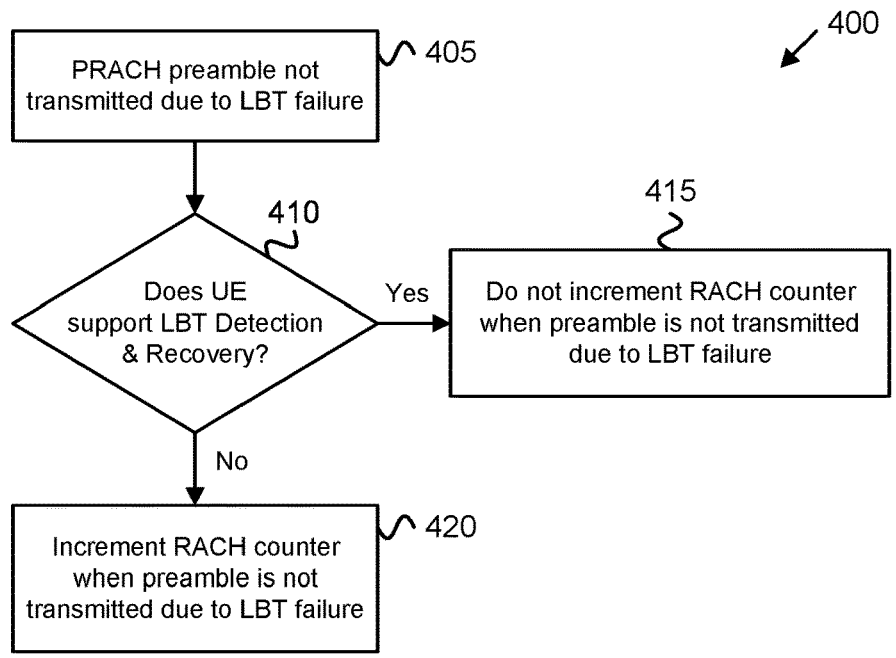
FIG. 4 is a diagram illustrating one embodiment of a procedure for RACH counter handling in case of LBT failure.

FIG. 4 depicts a procedure 400 for RACH counter handling in case of LBT failure, according to embodiments of the first solution. The procedure 400 is performed by a UE operating in a mobile communication network, such as the UE 205. According to a first solution, the UE behavior with respect to the RACH counter handling, e.g., PREAMBLE_TRANSMISSION_COUNTER, depends on the UE capability, i.e., whether the UE 205 supports LBT failure detection and recovery procedure.

For cases where the UE 205 does not support the LBT detection and recovery functionality, i.e., where the UE capability indicates that the functionality is not supported, the UE 205 increments the PREAMBLE_TRANSMISSION_COUNTER if the preamble is not transmitted due to LBT failure, i.e., where an LBT failure is indicated by the PHY layer 220 for the PRACH preamble transmission.

For cases where the UE 205 does support the LBT detection and recovery procedure, the UE 205 does not increment the PREAMBLE_TRANSMISSION_COUNTER if the preamble is not transmitted due to LBT failure.

As depicted, the procedure 400 begins as the UE 205 detects that PRACH preamble was not transmitted due to LBT failure (see block 405). The UE 205 determines whether it supports (i.e., has the capability for) LBT detection and recovery (see decision block 410). If yes, then the UE 205 does not increment the RACH counter (i.e., PREAMBLE_TRANSMISSION_COUNTER) when the preamble is not transmitted due to LBT failure (see block 415). Otherwise, if the UE 205 does not support LBT detection and recovery (i.e., also referred to as consistent LBT failure recovery procedure), then the UE 205 increments the RACH counter when the preamble is not transmitted due to LBT failure (see block 420).

Figure 5:
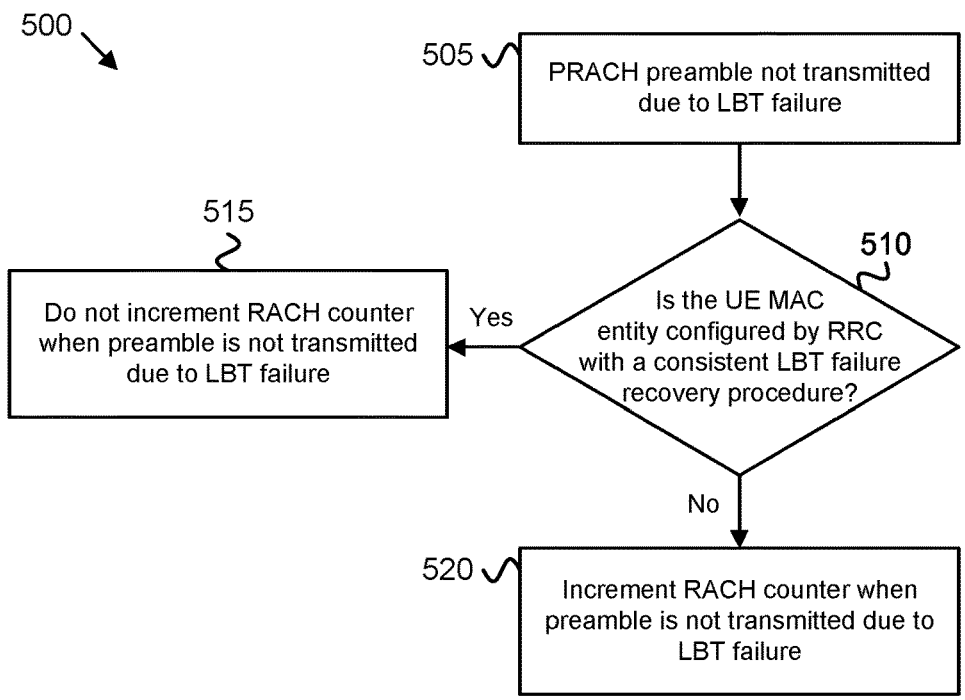
FIG. 5 is a diagram illustrating one embodiment of an alternative procedure for RACH counter handling in the case of LBT failure.

FIG. 5 depicts a procedure 500 for RACH counter handling in case of LBT failure, according to embodiments of the second solution. The procedure 500 is performed by a UE operating in a mobile communication network, such as the UE 205. According to the second solution, the UE behavior with respect to RACH counter handling depends on whether the UE 205 has been configured with the consistent LBT failure recovery procedure, e.g., whether parameter lbt-FailureRecoveryConfig is configured.

For cases where a MAC entity of the UE 205 is not configured by RRC with a consistent LBT failure recovery procedure, the UE 205 increments the PREAMBLE_TRANSMISSION_COUNTER if the preamble is not transmitted due to LBT failure, i.e., where an LBT failure is indicated by the PHY layer 220 for the PRACH preamble transmission.

For cases where the UE/MAC is configured by network with the consistent LBT failure recovery procedure, if the preamble is not transmitted due to LBT failure, then the UE 205 does not increment the PREAMBLE_TRANSMISSION_COUNTER.

As depicted, the procedure 500 begins as the UE 205 detects that PRACH preamble was not transmitted due to LBT failure (see block 505). The UE 205 determines whether the MAC entity is configured with consistent LBT failure recovery procedure (see decision block 510). If the MAC entity is configured with consistent LBT failure recovery procedure (e.g., parameter lbt-FailureRecoveryConfig is configured), then the UE 205 does not increment the RACH counter (i.e., PREAMBLE_TRANSMISSION_COUNTER) when the preamble is not transmitted due to LBT failure (see block 515). Otherwise, if the MAC entity is not configured with consistent LBT failure recovery procedure, then the UE 205 increments the RACH counter when the preamble is not transmitted due to LBT failure (see block 520).

Figure 6:
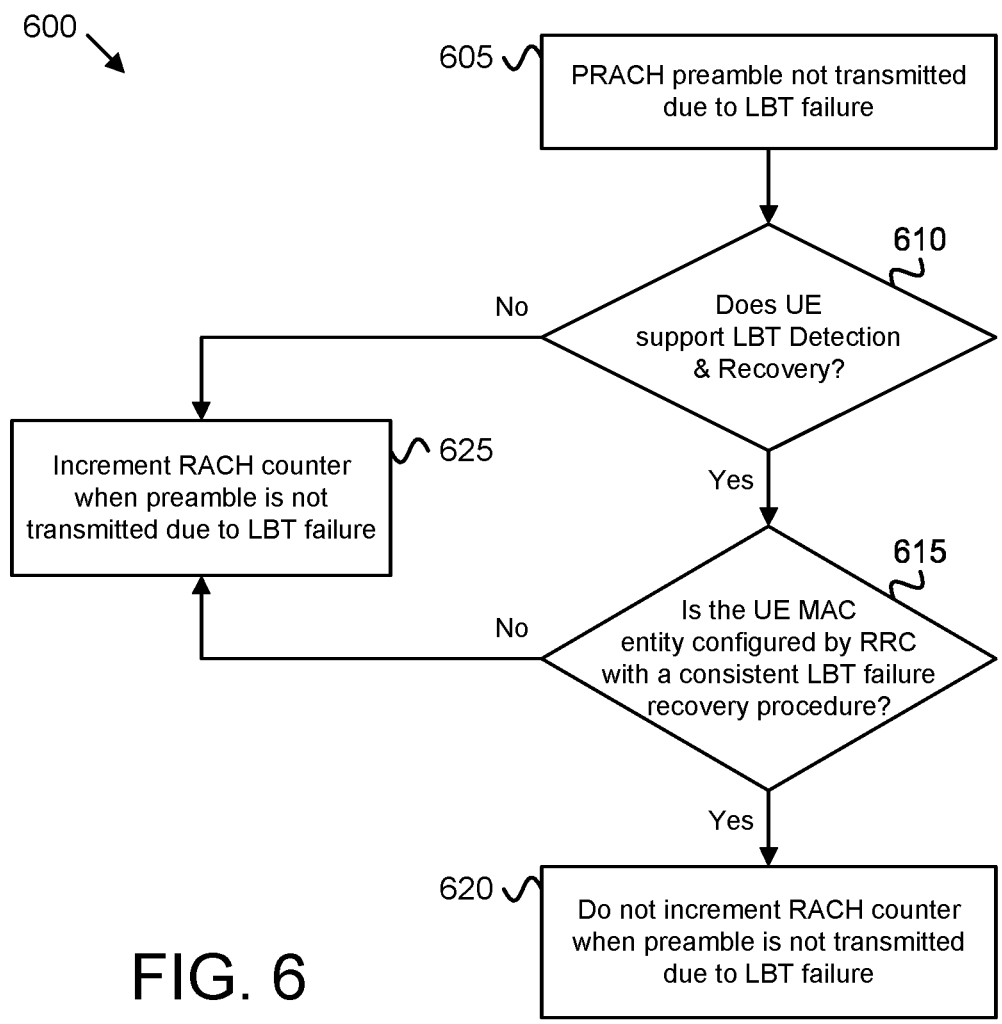
FIG. 6 is a diagram illustrating one embodiment of another procedure for RACH counter handling in case of LBT failure.

FIG. 6 depicts a procedure 600 for RACH counter handling in case of LBT failure, according to embodiments of the third solution. The procedure 600 is performed by a UE operating in a mobile communication network, such as the UE 205. According to the second solution, the UE behavior with respect to RACH counter handling does not depend only on the UE capability for LBT detection and recovery, but also depends on whether the UE 205 has been configured with the consistent LBT failure recovery procedure, e.g., whether parameter lbt-FailureRecoveryConfig is configured.

For cases where the UE 205 does not support the LBT detection and recovery functionality, (i.e., also referred to as consistent LBT failure recovery procedure), or where the MAC entity is not configured by RRC with a consistent LBT failure recovery procedure, the UE 205 increments the PREAMBLE_TRANSMISSION_COUNTER if the preamble is not transmitted due to LBT failure, i.e., where an LBT failure is indicated by the PHY layer 220 for the PRACH preamble transmission.

For cases where the UE 205 does support the consistent LBT failure recovery procedure and where the UE/MAC is configured by network with the consistent LBT failure recovery procedure, if the preamble is not transmitted due to LBT failure, then the UE 205 does not increment the PREAMBLE_TRANSMISSION_COUNTER.

As depicted, the procedure 600 begins as the UE 205 detects that PRACH preamble was not transmitted due to LBT failure (see block 605). The UE 205 determines whether it supports (i.e., has the capability for) LBT detection and recovery (see decision block 610). If yes, then the UE 205 determines whether the MAC entity is configured with consistent LBT failure recovery procedure (see decision block 615). If the UE 205 both supports LBT detection and recovery (i.e., also referred to as consistent LBT failure recovery procedure) and the MAC entity is configured with consistent LBT failure recovery procedure (e.g., parameter lbt-FailureRecoveryConfig is configured), then the UE 205 does not increment the RACH counter (i.e., PREAMBLE_TRANSMISSION_COUNTER) when the preamble is not transmitted due to LBT failure (see block 620). Otherwise, if the UE 205 does not support LBT detection and recovery—or if the MAC entity is not configured with consistent LBT failure recovery procedure, then the UE 205 increments the RACH counter when the preamble is not transmitted due to LBT failure (see block 625).

FIG. 7 shows proposed text 700 outlining one implementation 705 of the third solution. As depicted, the 3GPP specifications relating to Random Access Preamble transmission (i.e., described in clause 5.1.3 of 3GPP TS 38.321). According to the implementation 705, if the PREAMBLE_TRANSMISSION_COUNTER is greater than one and if an LBT failure indication is received from lower layers for the last PRACH preamble transmission, then the UE may increment the PREAMBLE_TRANSMISSION_COUNTER by one, based on whether the UE supports and/or is configured with the consistent LBT failure recovery procedure.

Figure 8:
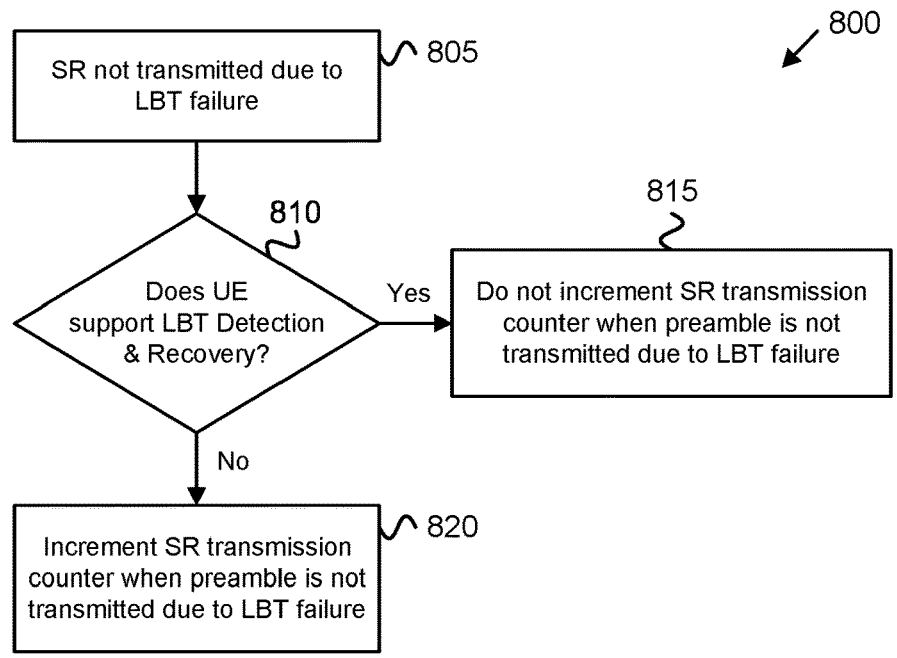
FIG. 8 is a diagram illustrating one embodiment of a procedure for SR counter handling in case of LBT failure.

FIG. 8 depicts a procedure 800 for SR transmission counter handling in case of LBT failure, according to embodiments of the fourth solution. The procedure 800 is performed by a UE operating in a mobile communication network, such as the UE 205. According to the third solution, the UE behavior with respect to the SR transmission counter handling (e.g., SR_COUNTER) depends on the UE capability, i.e., whether the UE 205 supports LBT failure detection and recovery procedure.

For cases where the UE 205 does not support the LBT detection and recovery functionality (i.e., where the UE capability indicates that the functionality is not supported), the UE 205 increments the SR transmission counter (e.g., SR_COUNTER) if the SR (e.g., on PUCCH) is not transmitted due to LBT failure, i.e., where an LBT failure is indicated by PHY layer 220 for the SR transmission.

For cases where the UE 205 does support the LBT detection and recovery procedure, the UE 205 does not increment the SR transmission counter if the SR is not transmitted due to an LBT failure.

As depicted, the procedure 800 begins as the UE 205 detects that an SR was not transmitted due to LBT failure (see block 805). The UE 205 determines whether it supports (i.e., has the capability for) LBT detection and recovery (see decision block 810). If yes, then the UE 205 does not increment the SR transmission counter (e.g., SR_COUNTER) when the SR is not transmitted due to LBT failure (see block 815). Otherwise, if the UE 205 does not support LBT detection and recovery (i.e., also referred to as consistent LBT failure recovery procedure), then the UE 205 increments the SR transmission counter when the SR is not transmitted due to LBT failure (see block 820).

Figure 9:
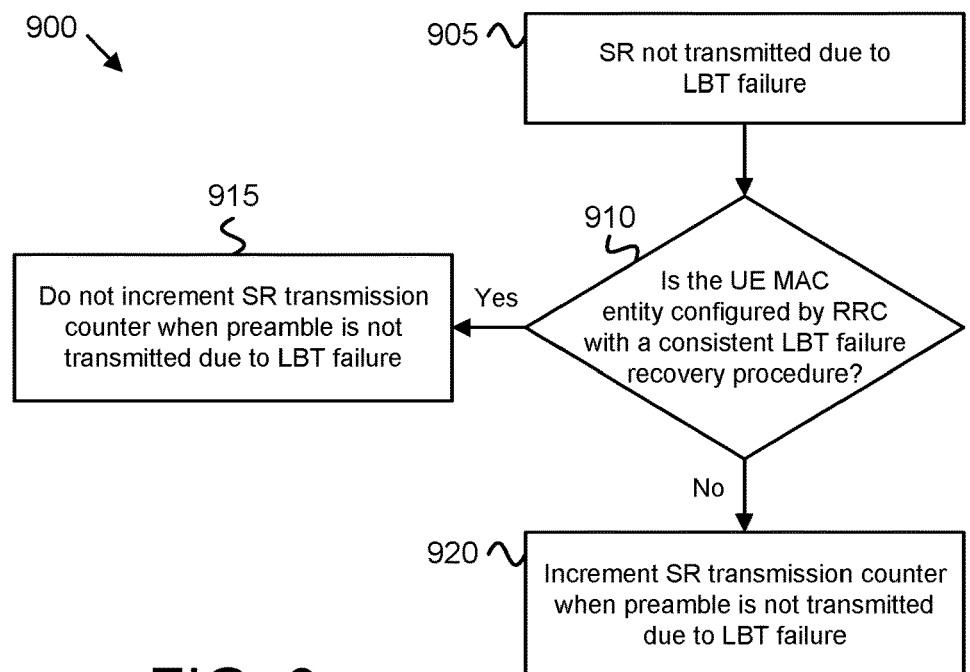
FIG. 9 is a diagram illustrating one embodiment of an alternative procedure for SR counter handling in the case of LBT failure.

FIG. 9 depicts a procedure 900 for SR transmission counter handling in case of LBT failure, according to embodiments of a fifth solution. The procedure 900 is performed by a UE operating in a mobile communication network, such as the UE 205. According to the fifth solution, the UE behavior with respect to SR_COUNTER handling depends on whether the UE 205 has been configured with the consistent LBT failure recovery procedure, i.e., if lbt-FailureRecoveryConfig is configured.

For cases where the MAC entity is not configured by RRC with a consistent LBT failure recovery procedure, the UE 205 increments the SR transmission counter (e.g., SR_COUNTER) if the SR (e.g., on PUCCH) is not transmitted due to LBT failure, i.e., an LBT failure is indicated by PHY for the SR transmission.

For cases where the UE/MAC is configured by network with the consistent LBT failure recovery procedure, the UE 205 does not increment the SR_COUNTER if the SR is not transmitted due to LBT failure.

As depicted, the procedure 900 begins as the UE 205 detects that SR was not transmitted due to LBT failure (see block 905). The UE 205 determines whether the MAC entity is configured with consistent LBT failure recovery procedure (see decision block 910). If the MAC entity is configured with consistent LBT failure recovery procedure (e.g., parameter lbt-FailureRecoveryConfig is configured), then the UE 205 does not increment the SR transmission counter (e.g., SR_COUNTER) when the SR is not transmitted due to LBT failure (see block 915). Otherwise, if the MAC entity is not configured with consistent LBT failure recovery procedure, then the UE 205 increments the SR transmission counter when the SR is not transmitted due to LBT failure (see block 920).

Figure 10:
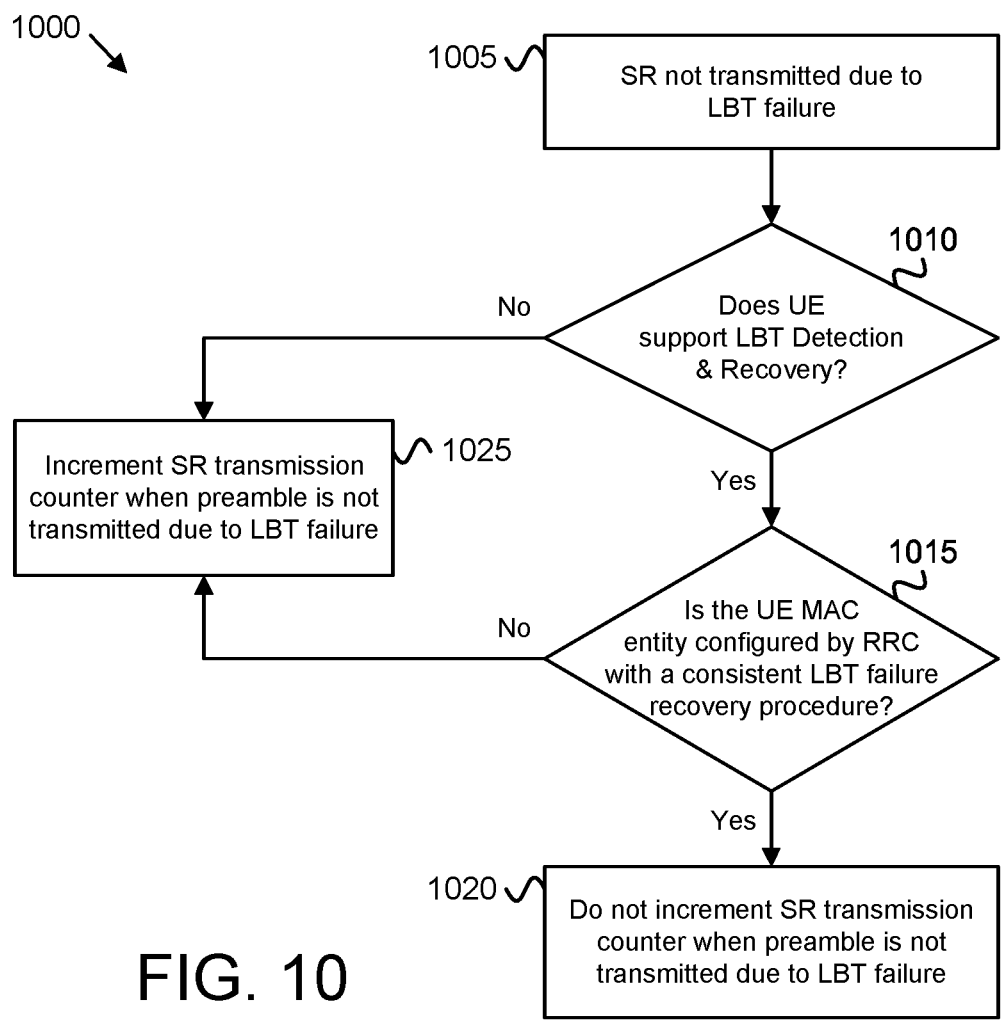
FIG. 10 is a diagram illustrating one embodiment of another procedure for SR counter handling in case of LBT failure.

FIG. 10 depicts a procedure 1000 for SR transmission counter handling in case of LBT failure, according to embodiments of the sixth solution. The procedure 1000 is performed by a UE operating in a mobile communication network, such as the UE 205. According to a fourth solution, the UE behavior with respect to SR_COUNTER handling does not depend only on the UE capability, but also depends on whether the UE 205 has been configured with the consistent LBT failure recovery procedure, i.e., if lbt-FailureRecoveryConfig is configured.

For cases where the UE 205 does not support the LBT detection and recovery functionality, i.e., also referred to as consistent LBT failure recovery procedure, or where the MAC entity is not configured by RRC with a consistent LBT failure recovery procedure, the UE 205 increments the SR transmission counter (e.g., SR_COUNTER) if the SR (e.g., on PUCCH) is not transmitted due to LBT failure, i.e., an LBT failure is indicated by PHY for the SR transmission.

For cases where the UE 205 does support the consistent LBT failure recovery procedure and where the UE/MAC is configured by network with the consistent LBT failure recovery procedure, the UE 205 does not increment the SR_COUNTER if the SR is not transmitted due to LBT failure.

As depicted, the procedure 1000 begins as the UE 205 detects that SR was not transmitted due to LBT failure (see block 1005). The UE 205 determines whether it supports (i.e., has the capability for) LBT detection and recovery (see decision block 1010). If yes, then the UE 205 determines whether the MAC entity is configured with consistent LBT failure recovery procedure (see decision block 1015). If both the UE 205 supports LBT detection and recovery (i.e., also referred to as consistent LBT failure recovery procedure) and the MAC entity is configured with consistent LBT failure recovery procedure (e.g., parameter lbt-FailureRecoveryConfig is configured), then the UE 205 does not increment the SR transmission counter (e.g., SR_COUNTER) when the SR is not transmitted due to LBT failure (see block 1020). Otherwise, if the UE 205 does not support LBT detection and recovery—or if the MAC entity is not configured with consistent LBT failure recovery procedure, then the UE 205 increments the SR transmission counter when the SR is not transmitted due to LBT failure (see block 1025).

According to a seventh solution, the PHY layer 220 of the UE 205 indicates an LBT success to the MAC layer 225 for cases when the consistent LBT failure recovery procedure is not used by the UE 205. As noted above, the UE 205 may not use the consistent LBT failure recovery procedure due to UE capability (i.e., where the UE 205 does not support LBT detection and recovery functionality) and/or due to the network not configuring the consistent LBT failure recovery functionality (i.e., no lbt-FailureRecoveryConfig configured).

In some embodiments, the PHY layer 220 indicates LBT success even for cases when the PRACH transmission cannot be performed due to LBT failure. In some embodiments, the PHY layer 220 indicates LBT success even for cases when the SR transmission cannot be performed due to LBT failure.

Figure 11:
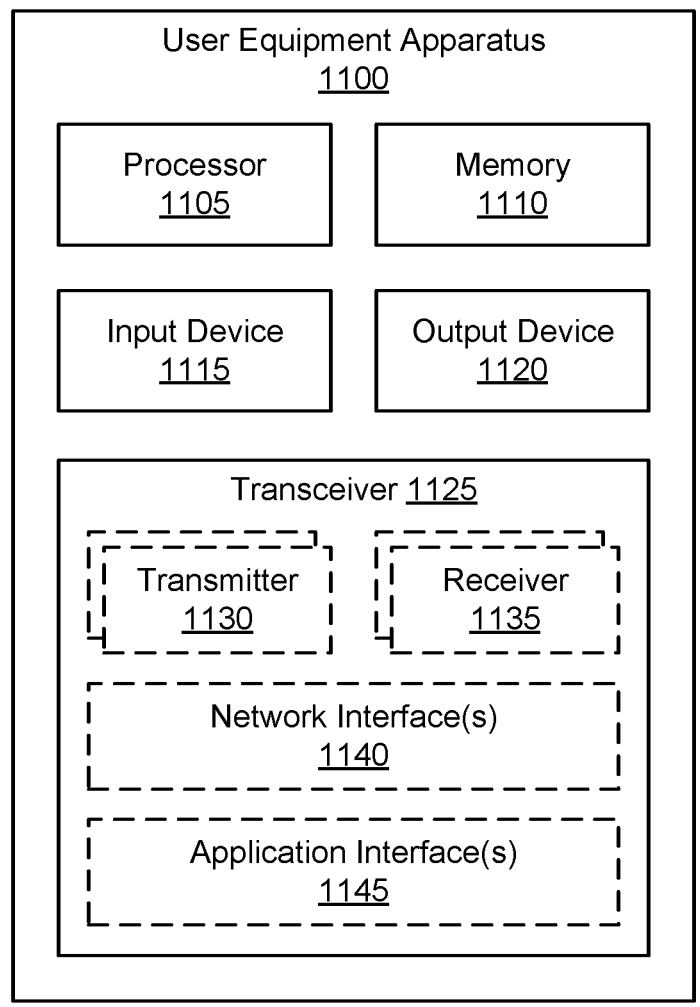
FIG. 11 is a diagram illustrating one embodiment of a user equipment apparatus that may be used for counter handling in case of LBT failure.

FIG. 11 depicts a user equipment apparatus 1100 that may be used for counter handling in case of LBT failure, according to embodiments of the disclosure. In various embodiments, the user equipment apparatus 1100 is used to implement one or more of the solutions described above. The user equipment apparatus 1100 may be one embodiment of the remote unit 105 and/or the UE 205, described above. Furthermore, the user equipment apparatus 1100 may include a processor 1105, a memory 1110, an input device 1115, an output device 1120, and a transceiver 1125.

In some embodiments, the input device 1115 and the output device 1120 are combined into a single device, such as a touchscreen. In certain embodiments, the user equipment apparatus 1100 may not include any input device 1115 and/or output device 1120. In various embodiments, the user equipment apparatus 1100 may include one or more of: the processor 1105, the memory 1110, and the transceiver 1125, and may not include the input device 1115 and/or the output device 1120.

As depicted, the transceiver 1125 includes at least one transmitter 1130 and at least one receiver 1135. In some embodiments, the transceiver 1125 communicates with one or more cells (or wireless coverage areas) supported by one or more base units 121. In various embodiments, the transceiver 1125 is operable on unlicensed spectrum. Moreover, the transceiver 1125 may include multiple UE panels supporting one or more beams. Additionally, the transceiver 1125 may support at least one network interface 1140 and/or application interface 1145. The application interface(s) 1145 may support one or more APIs. The network interface(s) 1140 may support 3GPP reference points, such as Uu, N1, PC5, etc. Other network interfaces 1140 may be supported, as understood by one of ordinary skill in the art.

The processor 1105, in one embodiment, may include any known controller capable of executing computer-readable instructions and/or capable of performing logical operations. For example, the processor 1105 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 1105 executes instructions stored in the memory 1110 to perform the methods and routines described herein. The processor 1105 is communicatively coupled to the memory 1110, the input device 1115, the output device 1120, and the transceiver 1125.

In various embodiments, the processor 1105 controls the user equipment apparatus 1100 to implement the above described UE behaviors. In certain embodiments, the processor 1105 may include an application processor (also known as "main processor") which manages application-domain and operating system ("OS") functions and a baseband processor (also known as "baseband radio processor") which manages radio functions.

In various embodiments, the processor 1105 controls the user equipment apparatus 1100 to implement the above described UE behaviors. For example, the processor 1105 performs a Listen-Before-Talk ("LBT") procedure for a transmission and detects LBT failure for the transmission.

In some embodiments, the processor 1105 determines whether a medium access control ("MAC") entity of the user equipment apparatus 1100 is configured with a consistent LBT failure recovery procedure. If the MAC entity is not configured with the consistent LBT failure recovery procedure, the processor 1105 increments a transmission counter without transmission of an uplink transmission in response to an indication of the LBT failure.

However, if the MAC entity is configured with the consistent LBT failure recovery procedure, then the processor 1105 prevents incrementation of the transmission counter without transmission of an uplink transmission in response to the indication of the LBT failure. In some embodiments, wherein the UE comprises a physical layer. In such embodiments, detecting LBT failure for the transmission may include the physical layer sending a LBT failure indication to the MAC entity.

In some embodiments, the processor 1105 determines whether consistent LBT failure recovery functionality is supported at the user equipment apparatus 1100. If the UE does not support the consistent LBT failure recovery functionality, then the processor 1105 increments a preamble transmission counter without transmission of an uplink transmission in response to the indication of the LBT failure. However, if the user equipment apparatus 1100 supports the consistent LBT failure recovery functionality and the AMC entity is configured with the consistent LBT failure recovery procedure, then the processor 1105 prevents incrementation of the transmission counter without transmission of an uplink transmission in response to the LBT failure.

In certain embodiments, the transmission may be a RACH preamble transmission. In such embodiments, the transmission counter may be a preamble transmission counter. In certain embodiments, the transmission may be a SR transmission. In such embodiments, the transmission counter may be a SR transmission counter.

In some embodiments, the processor 1105 determines whether consistent LBT failure recovery functionality is supported at the user equipment apparatus 1100. If the user equipment apparatus 1100 does not support consistent LBT failure recovery functionality, the processor 1105 indicates an LBT success by to a MAC entity of the user equipment apparatus 1100 without performing a corresponding uplink transmission in response to the LBT failure.

In some embodiments, determining that consistent LBT failure recovery functionality is not supported occurs in response to the MAC entity not being configured with a consistent LBT failure recovery procedure. In certain embodiments, the transmission may be a RACH preamble transmission. In other embodiments, the transmission may be a SR transmission.

The memory 1110, in one embodiment, is a computer readable storage medium. In some embodiments, the memory 1110 includes volatile computer storage media. For example, the memory 1110 may include a RAM, including dynamic RAM ("DRAM"), synchronous dynamic RAM ("SDRAM"), and/or static RAM ("SRAM"). In some embodiments, the memory 1110 includes non-volatile computer storage media. For example, the memory 1110 may include a hard disk drive, a flash memory, or any other suitable non-volatile computer storage device. In some embodiments, the memory 1110 includes both volatile and non-volatile computer storage media.

In some embodiments, the memory 1110 stores data related to counter handling in case of LBT failure. For example, the memory 1110 may store various parameters, panel/beam configurations, resource assignments, policies, and the like as described above. In certain embodiments, the memory 1110 also stores program code and related data, such as an operating system or other controller algorithms operating on the apparatus 1100.

The input device 1115, in one embodiment, may include any known computer input device including a touch panel, a button, a keyboard, a stylus, a microphone, or the like. In some embodiments, the input device 1115 may be integrated with the output device 1120, for example, as a touchscreen or similar touch-sensitive display. In some embodiments, the input device 1115 includes a touchscreen such that text may be input using a virtual keyboard displayed on the touchscreen and/or by handwriting on the touchscreen. In some embodiments, the input device 1115 includes two or more different devices, such as a keyboard and a touch panel.

The output device 1120, in one embodiment, is designed to output visual, audible, and/or haptic signals. In some embodiments, the output device 1120 includes an electronically controllable display or display device capable of outputting visual data to a user. For example, the output device 1120 may include, but is not limited to, an LCD display, an LED display, an OLED display, a projector, or similar display device capable of outputting images, text, or the like to a user. As another, non-limiting, example, the output device 1120 may include a wearable display separate from, but communicatively coupled to, the rest of the user equipment apparatus 1100, such as a smart watch, smart glasses, a heads-up display, or the like. Further, the output device 1120 may be a component of a smart phone, a personal digital assistant, a television, a table computer, a notebook (laptop) computer, a personal computer, a vehicle dashboard, or the like.

In certain embodiments, the output device 1120 includes one or more speakers for producing sound. For example, the output device 1120 may produce an audible alert or notification (e.g., a beep or chime). In some embodiments, the output device 1120 includes one or more haptic devices for producing vibrations, motion, or other haptic feedback. In some embodiments, all or portions of the output device 1120 may be integrated with the input device 1115. For example, the input device 1115 and output device 1120 may form a touchscreen or similar touch-sensitive display. In other embodiments, the output device 1120 may be located near the input device 1115.

The transceiver 1125 communicates with one or more network functions of a mobile communication network via one or more access networks. The transceiver 1125 operates under the control of the processor 1105 to transmit messages, data, and other signals and also to receive messages, data, and other signals. For example, the processor 1105 may selectively activate the transceiver 1125 (or portions thereof) at particular times in order to send and receive messages.

The transceiver 1125 includes at least transmitter 1130 and at least one receiver 1135. One or more transmitters 1130 may be used to provide UL communication signals to a base unit 121, such as the UL transmissions described herein. Similarly, one or more receivers 1135 may be used to receive DL communication signals from the base unit 121, as described herein. Although only one transmitter 1130 and one receiver 1135 are illustrated, the user equipment apparatus 1100 may have any suitable number of transmitters 1130 and receivers 1135. Further, the transmitter(s) 1130 and the receiver(s) 1135 may be any suitable type of transmitters and receivers. In one embodiment, the transceiver 1125 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 1125, transmitters 1130, and receivers 1135 may be implemented as physically separate components that access a shared hardware resource and/or software resource, such as for example, the network interface 1140.

In various embodiments, one or more transmitters 1130 and/or one or more receivers 1135 may be implemented and/or integrated into a single hardware component, such as a multi-transceiver chip, a system-on-a-chip, an ASIC, or other type of hardware component. In certain embodiments, one or more transmitters 1130 and/or one or more receivers 1135 may be implemented and/or integrated into a multi-chip module. In some embodiments, other components such as the network interface 1140 or other hardware components/circuits may be integrated with any number of transmitters 1130 and/or receivers 1135 into a single chip. In such embodiment, the transmitters 1130 and receivers 1135 may be logically configured as a transceiver 1125 that uses one more common control signals or as modular transmitters 1130 and receivers 1135 implemented in the same hardware chip or in a multi-chip module.

Figure 12:
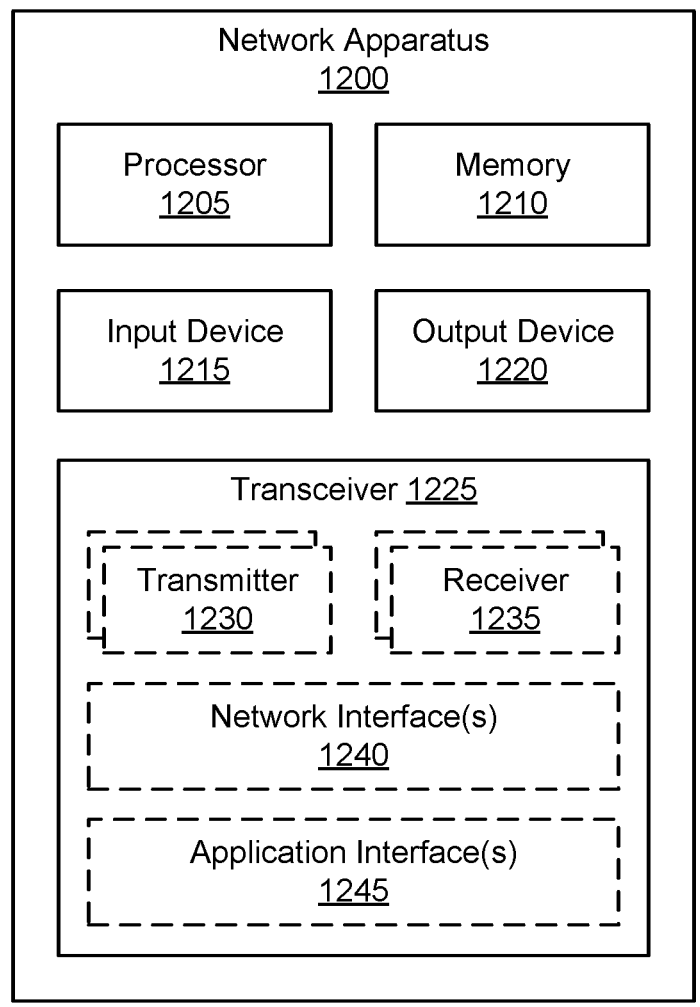
FIG. 12 is a diagram illustrating one embodiment of a network apparatus that may be used for counter handling in case of LBT failure.

FIG. 12 depicts a network apparatus 1200 that may be used for counter handling in case of LBT failure, according to embodiments of the disclosure. In one embodiment, network apparatus 1200 may be one implementation of a RAN node, such as the base unit 121, the RAN node 212, or a gNB, as described above. Furthermore, the base network apparatus 1200 may include a processor 1205, a memory 1210, an input device 1215, an output device 1220, and a transceiver 1225.

In some embodiments, the input device 1215 and the output device 1220 are combined into a single device, such as a touchscreen. In certain embodiments, the network apparatus 1200 may not include any input device 1215 and/or output device 1220. In various embodiments, the network apparatus 1200 may include one or more of: the processor 1205, the memory 1210, and the transceiver 1225, and may not include the input device 1215 and/or the output device 1220.

As depicted, the transceiver 1225 includes at least one transmitter 1230 and at least one receiver 1235. Here, the transceiver 1225 communicates with one or more remote units 125. Additionally, the transceiver 1225 may support at least one network interface 1240 and/or application interface 1245. The application interface(s) 1245 may support one or more APIs. The network interface(s) 1240 may support 3GPP reference points, such as Uu, N1, N2 and N3. Other network interfaces 1240 may be supported, as understood by one of ordinary skill in the art.

The processor 1205, in one embodiment, may include any known controller capable of executing computer-readable instructions and/or capable of performing logical operations. For example, the processor 1205 may be a microcontroller, a microprocessor, a CPU, a GPU, an auxiliary processing unit, a FPGA, or similar programmable controller. In some embodiments, the processor 1205 executes instructions stored in the memory 1210 to perform the methods and routines described herein. The processor 1205 is communicatively coupled to the memory 1210, the input device 1215, the output device 1220, and the transceiver 1225.

In various embodiments, the network apparatus 1200 is a RAN node (e.g., gNB) that communicates with one or more UEs, as described herein. In such embodiments, the processor 1205 controls the network apparatus 1200 to perform the above described RAN behaviors. When operating as a RAN node, the processor 1205 may include an application processor (also known as "main processor") which manages application-domain and operating system ("OS") functions and a baseband processor (also known as "baseband radio processor") which manages radio functions.

The memory 1210, in one embodiment, is a computer readable storage medium. In some embodiments, the memory 1210 includes volatile computer storage media. For example, the memory 1210 may include a RAM, including dynamic RAM ("DRAM"), synchronous dynamic RAM ("SDRAM"), and/or static RAM ("SRAM"). In some embodiments, the memory 1210 includes non-volatile computer storage media. For example, the memory 1210 may include a hard disk drive, a flash memory, or any other suitable non-volatile computer storage device. In some embodiments, the memory 1210 includes both volatile and non-volatile computer storage media.

In some embodiments, the memory 1210 stores data related to counter handling in case of LBT failure. For example, the memory 1210 may store parameters, configurations, resource assignments, policies, and the like, as described above. In certain embodiments, the memory 1210 also stores program code and related data, such as an operating system or other controller algorithms operating on the apparatus 1200.

The input device 1215, in one embodiment, may include any known computer input device including a touch panel, a button, a keyboard, a stylus, a microphone, or the like. In some embodiments, the input device 1215 may be integrated with the output device 1220, for example, as a touchscreen or similar touch-sensitive display. In some embodiments, the input device 1215 includes a touchscreen such that text may be input using a virtual keyboard displayed on the touchscreen and/or by handwriting on the touchscreen. In some embodiments, the input device 1215 includes two or more different devices, such as a keyboard and a touch panel.

The output device 1220, in one embodiment, is designed to output visual, audible, and/or haptic signals. In some embodiments, the output device 1220 includes an electronically controllable display or display device capable of outputting visual data to a user. For example, the output device 1220 may include, but is not limited to, an LCD display, an LED display, an OLED display, a projector, or similar display device capable of outputting images, text, or the like to a user. As another, non-limiting, example, the output device 1220 may include a wearable display separate from, but communicatively coupled to, the rest of the network apparatus 1200, such as a smart watch, smart glasses, a heads-up display, or the like. Further, the output device 1220 may be a component of a smart phone, a personal digital assistant, a television, a table computer, a notebook (laptop) computer, a personal computer, a vehicle dashboard, or the like.

In certain embodiments, the output device 1220 includes one or more speakers for producing sound. For example, the output device 1220 may produce an audible alert or notification (e.g., a beep or chime). In some embodiments, the output device 1220 includes one or more haptic devices for producing vibrations, motion, or other haptic feedback. In some embodiments, all or portions of the output device 1220 may be integrated with the input device 1215. For example, the input device 1215 and output device 1220 may form a touchscreen or similar touch-sensitive display. In other embodiments, the output device 1220 may be located near the input device 1215.

The transceiver 1225 includes at least transmitter 1230 and at least one receiver 1235. One or more transmitters 1230 may be used to communicate with the UE, as described herein. Similarly, one or more receivers 1235 may be used to communicate with network functions in the PLMN and/or RAN, as described herein. Although only one transmitter 1230 and one receiver 1235 are illustrated, the network apparatus 1200 may have any suitable number of transmitters 1230 and receivers 1235. Further, the transmitter(s) 1230 and the receiver(s) 1235 may be any suitable type of transmitters and receivers.

The transceiver 1225 is operable on unlicensed spectrum, wherein the transceiver 1225 includes a plurality of gNB panels. As used herein, a "gNB panel" refers to a logical entity that may be mapped to physical gNB antennas. Depending on the implementation, a "gNB panel" can have an operational role of Unit of antenna group to control its Tx beam independently.

Figure 13:
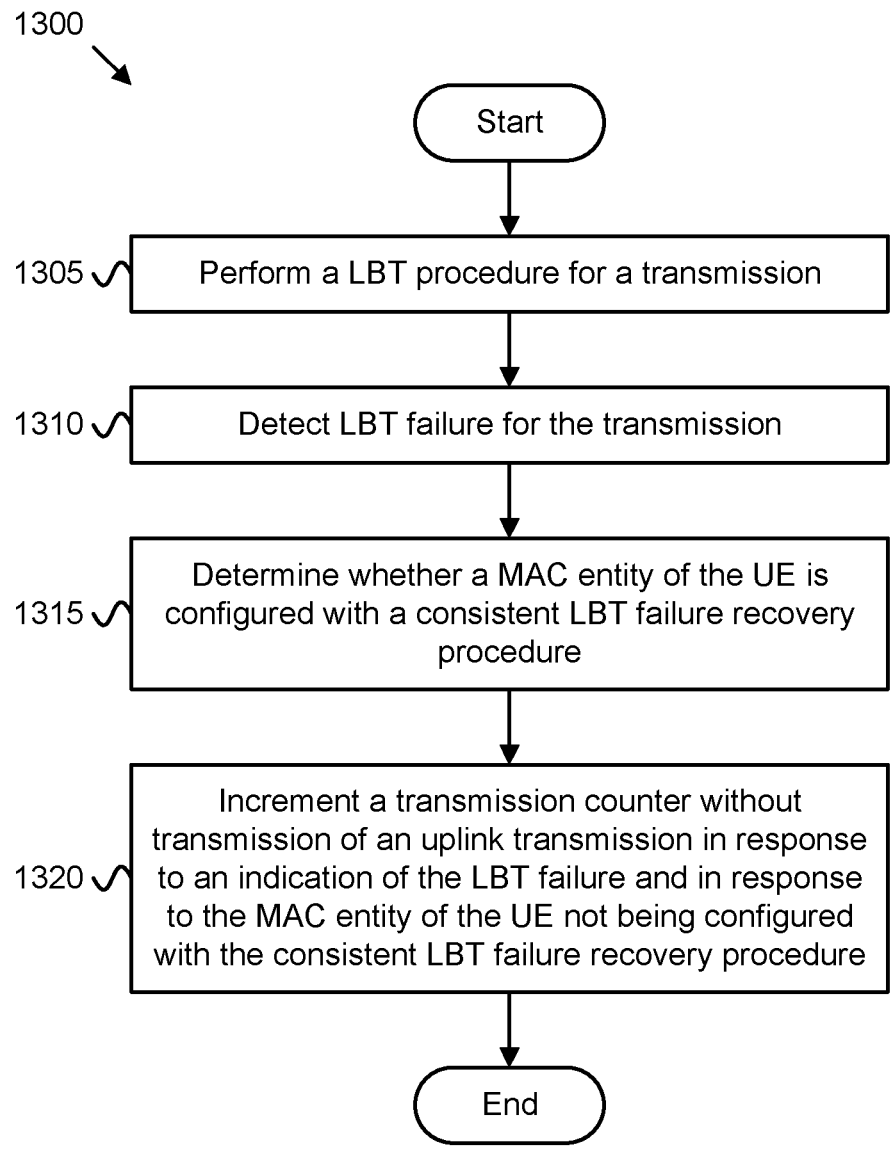
FIG. 13 is a flowchart diagram illustrating one embodiment of a first method for counter handling in case of LBT failure.

FIG. 13 depicts one embodiment of a method 1300 for counter handling in case of LBT failure, according to embodiments of the disclosure. In various embodiments, the method 1300 is performed by a user equipment device in a mobile communication network, such as the remote unit 105, the UE 205, and/or the user equipment apparatus 1100, described above. In some embodiments, the method 1300 is performed by a processor, such as a microcontroller, a microprocessor, a CPU, a GPU, an auxiliary processing unit, a FPGA, or the like.

The method 1300 begins and performs 1305 a LBT procedure for a transmission. The method 1300 includes detecting 1310 LBT failure for the transmission. The method 1300 includes determining 1315 whether a MAC entity of the UE is configured with a consistent LBT failure recovery procedure. If the MAC entity of the UE is not configured with the consistent LBT failure recovery procedure, the first method includes incrementing 1320 a transmission counter without transmission of an uplink transmission in response to an indication of the LBT failure. The method 1300 ends.

Figure 14:
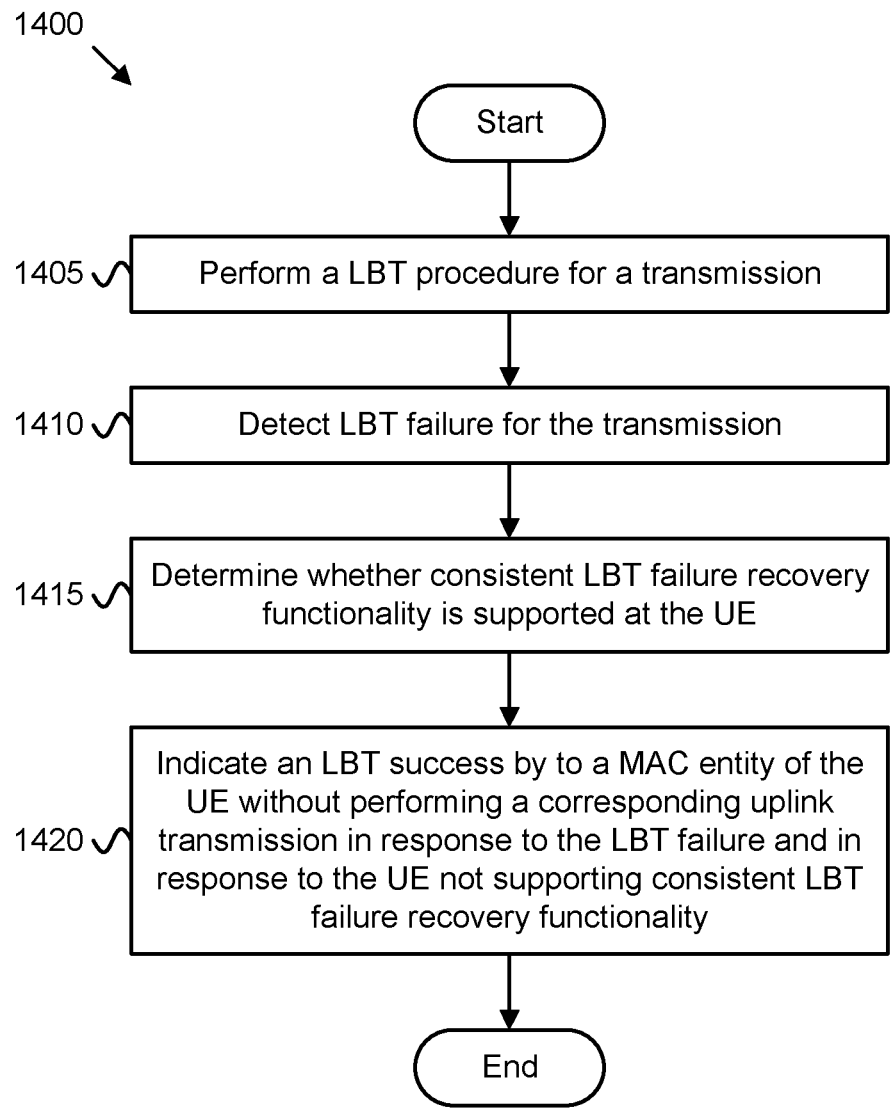
FIG. 14 is a flowchart diagram illustrating one embodiment of a second method for counter handling in case of LBT failure.

FIG. 14 depicts one embodiment of a method 1400 for counter handling in case of LBT failure, according to embodiments of the disclosure. In various embodiments, the method 1400 is performed by a user equipment device in a mobile communication network, such as the remote unit 105, the UE 205, and/or the user equipment apparatus 1100, described above. In some embodiments, the method 1400 is performed by a processor, such as a microcontroller, a microprocessor, a CPU, a GPU, an auxiliary processing unit, a FPGA, or the like.

The method 1400 begins and performs 1405 a LBT procedure for a transmission. The method 1400 includes detecting 1410 LBT failure for the transmission. The method 1400 includes determining 1415 whether consistent LBT failure recovery functionality is supported at the UE. If the UE does not support consistent LBT failure recovery functionality, the method 1400 includes indicating 1420 an LBT success by to a MAC entity of the UE without performing a corresponding uplink transmission in response to the LBT failure. The method 1400 ends.

Disclosed herein is a first apparatus for counter handling in case of LBT failure, according to embodiments of the disclosure. The first apparatus may be implemented by a user equipment device in a mobile communication network, such as the remote unit 105, the UE 205, and/or the user equipment apparatus 1100, described above. The first apparatus includes a processor and a transceiver for operation with shared spectrum channel access. The processor performs a Listen-Before-Talk ("LBT") procedure for a transmission and detects LBT failure for the transmission. The processor determines whether a medium access control ("MAC") entity of the UE is configured with a consistent LBT failure recovery procedure. If the MAC entity is not configured with the consistent LBT failure recovery procedure, the processor increments a transmission counter without transmission of an uplink transmission in response to an indication of the LBT failure.

However, if the MAC entity is configured with the consistent LBT failure recovery procedure, then the processor prevents incrementation of the transmission counter without transmission of an uplink transmission in response to the indication of the LBT failure. In some embodiments, wherein the UE comprises a physical layer. In such embodiments, detecting LBT failure for the transmission may include the physical layer sending a LBT failure indication to the MAC entity.

In some embodiments, the processor determines whether consistent LBT failure recovery functionality is supported at the UE. If the UE does not support the consistent LBT failure recovery functionality, then the processor increments a preamble transmission counter without transmission of an uplink transmission in response to the indication of the LBT failure. However, if the UE supports the consistent LBT failure recovery functionality and the AMC entity is configured with the consistent LBT failure recovery procedure, then the processor prevents incrementation of the transmission counter without transmission of an uplink transmission in response to the LBT failure.

In certain embodiments, the transmission may be a RACH preamble transmission. In such embodiments, the transmission counter may be a preamble transmission counter. In certain embodiments, the transmission may be a SR transmission. In such embodiments, the transmission counter may be a SR transmission counter.

Disclosed herein is a first method for counter handling in case of LBT failure, according to embodiments of the disclosure. The first method may be performed by a user equipment device in a mobile communication network, such as the remote unit 105, the UE 205, and/or the user equipment apparatus 1100. The first method includes performing a LBT procedure for a transmission and detecting LBT failure for the transmission. The first method includes determining whether a MAC entity of the UE is configured with a consistent LBT failure recovery procedure. If the MAC entity of the UE is not configured with the consistent LBT failure recovery procedure, the first method includes incrementing a transmission counter without transmission of an uplink transmission in response to an indication of the LBT failure.

However, if the MAC entity of the UE is configured with the consistent LBT failure recovery procedure, then the first method includes preventing incrementation of the transmission counter without transmission of an uplink transmission in response to the indication of the LBT failure. In some embodiments, the UE comprises a physical layer. In such embodiments, detecting LBT failure for the transmission may include the physical layer sending a LBT failure indication to the MAC entity.

In some embodiments, the first method includes determining whether consistent LBT failure recovery functionality is supported at the UE. If the UE does not support the consistent LBT failure recovery functionality, then the first method includes incrementing a preamble transmission counter without transmission of an uplink transmission in response to the indication of the LBT failure. However, if the UE supports the consistent LBT failure recovery functionality and if the MAC entity is configured with the consistent LBT failure recovery procedure, then the first method includes preventing incrementation of the transmission counter without transmission of an uplink transmission in response to the LBT failure.

In certain embodiments, the transmission may be a RACH preamble transmission. In such embodiments, the transmission counter may be a preamble transmission counter. In certain embodiments, the transmission may be a SR transmission. In such embodiments, the transmission counter may be a SR transmission counter.

Disclosed herein is a second apparatus for counter handling in case of LBT failure, according to embodiments of the disclosure. The second apparatus may be implemented by a user equipment device in a mobile communication network, such as the remote unit 105, the UE 205, and/or the user equipment apparatus 1100, described above. The second apparatus includes a processor and a transceiver for operation with shared spectrum channel access. The processor performs a LBT procedure for a transmission (e.g., on shared spectrum) and detects LBT failure for the transmission opportunity. The processor determines whether consistent LBT failure recovery functionality is supported at the UE. If the UE does not support consistent LBT failure recovery functionality, the processor indicates an LBT success by to a MAC entity of the UE without performing a corresponding uplink transmission in response to the LBT failure.

In some embodiments, determining that consistent LBT failure recovery functionality is not supported occurs in response to the MAC entity not being configured with a consistent LBT failure recovery procedure. In certain embodiments, the transmission may be a RACH preamble transmission. In other embodiments, the transmission may be a SR transmission.

Disclosed herein is a second method for counter handling in case of LBT failure, according to embodiments of the disclosure. The second method may be performed by a user equipment device in a mobile communication network, such as the remote unit 105, the UE 205, and/or the user equipment apparatus 1100. The second method includes performing a LBT procedure for a transmission and detecting LBT failure for the transmission. The second method includes determining whether consistent LBT failure recovery functionality is supported at the UE. If the UE does not support consistent LBT failure recovery functionality, the second method includes indicating an LBT success by to a MAC entity of the UE without performing a corresponding uplink transmission in response to the LBT failure.

In some embodiments, determining that consistent LBT failure recovery functionality is not supported occurs in response to the MAC entity not being configured with a consistent LBT failure recovery procedure. In certain embodiments, the transmission may be a RACH preamble transmission. In other embodiments, the transmission may be a SR transmission.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment User Equipment ("UE"), the method comprising:
    performing a Listen-Before-Talk ("LBT") procedure for a transmission with shared spectrum channel access, wherein the transmission comprises a Random Access Channel ("RACH") preamble transmission or a Scheduling Request ("SR") transmission;
    detecting an LBT failure for the transmission;
    determining whether a consistent LBT failure recovery procedure is configured;
    incrementing a transmission counter without transmission of an uplink transmission in response to detecting the LBT failure and in response to determining that the consistent LBT failure recovery procedure is not configured; and
    triggering a failure of a RACH procedure or a failure of an SR procedure in response to the transmission reaching a maximum value.

2. The method of claim 1, further comprising preventing incrementation of the transmission counter without transmission of an uplink transmission in response to the indication of the LBT failure and in response to determining that the consistent LBT failure recovery procedure is configured.

3. The method of claim 1, further comprising:
    determining whether consistent LBT failure recovery functionality is supported at the UE; and
    incrementing a preamble transmission counter without transmission of an uplink transmission in response to the LBT failure and in response to the UE not supporting the consistent LBT failure recovery functionality.

4. The method of claim 3, further comprising preventing incrementation of the transmission counter without transmission of an uplink transmission in response to the LBT failure and in response to the UE supporting the consistent LBT failure recovery functionality and further in response to determining that the consistent LBT failure recovery procedure is configured.

5. The method of claim 1, wherein the transmission counter comprises a preamble transmission counter when the transmission comprising the RACH preamble transmission.

6. The method of claim 1 wherein the transmission counter comprises a SR transmission counter when the transmission comprises the SR transmission.

7. The method of claim 1, wherein the UE comprises a physical layer, wherein detecting LBT failure for the transmission comprises the physical layer sending a LBT failure indication to a Medium Access Control ("MAC") entity of the UE.

8. A User Equipment ("UE") for wireless communication, comprising:
    a memory; and
    a processor coupled with the memory and configured to cause the UE to:
        perform a Listen-Before-Talk ("LBT") procedure for a transmission with shared spectrum channel access, wherein the transmission comprises a Random Access Channel ("RACH") preamble transmission or a Scheduling Request ("SR") transmission;
        detect LBT failure for the transmission;
        determine whether a consistent LBT failure recovery procedure is configured;
        increment a transmission counter without transmission of an uplink transmission in response to detecting the LBT failure and in response to determining that the consistent LBT failure recovery procedure is not configured; and
        trigger a failure of a RACH procedure or a failure of an SR procedure in response to the transmission reaching a maximum value.

9. The UE of claim 8, wherein the processor is configured to cause the UE to prevent incrementation of the transmission counter without transmission of an uplink transmission in response to the LBT failure and in response to determining that the consistent LBT failure recovery procedure is configured.

10. The UE of claim 8, wherein the processor is further configured to cause the UE to:
   determine whether consistent LBT failure recovery functionality is supported at the UE; and
   increment a preamble transmission counter without transmission of an uplink transmission in response to the LBT failure and in response to the UE not supporting the consistent LBT failure recovery functionality.

11. The UE of claim 10, wherein the processor is configured to cause the UE to prevent incrementation of the transmission counter without transmission of an uplink transmission in response to the LBT failure and in response to the UE supporting the consistent LBT failure recovery functionality and further in response to determining that the consistent LBT failure recovery procedure is configured.

12. The UE of claim 8, wherein the transmission counter comprises a preamble transmission counter when the transmission comprising the RACH preamble transmission.

13. The UE of claim 8, wherein the transmission counter comprises a SR transmission counter when the transmission comprises the SR transmission.

14. The UE of claim 8, wherein, to detect LBT failure for the transmission, the processor is configured to cause a physical layer of the UE to send a LBT failure indication to a Medium Access Control ("MAC") entity of the UE.

15. A processor for wireless communication, comprising:
   at least one controller coupled with at least one memory and configured to cause the processor to:
      perform a Listen-Before-Talk ("LBT") procedure for a transmission with shared spectrum channel access, wherein the transmission comprises a Random Access Channel ("RACH") preamble transmission or a Scheduling Request ("SR") transmission;
      detect LBT failure for the transmission;
      determine whether a consistent LBT failure recovery procedure is configured;
      increment a transmission counter without transmission of an uplink transmission in response to detecting the LBT failure and in response to determining that the consistent LBT failure recovery procedure is not configured; and
      trigger a failure of a RACH procedure or a failure of an SR procedure in response to the transmission reaching a maximum value.

16. The processor of claim 15, wherein the controller is configured to cause the processor to prevent incrementation of the transmission counter without transmission of an uplink transmission in response to the LBT failure and in response to determining that the consistent LBT failure recovery procedure is configured.

17. The processor of claim 15, wherein the controller is configured to cause the processor to:
   determine whether consistent LBT failure recovery functionality is supported; and
   increment a preamble transmission counter without transmission of an uplink transmission in response to the LBT failure and in response to the consistent LBT failure recovery functionality not being supported.

18. The processor of claim 17, wherein the controller is configured to cause the processor to prevent incrementation of the transmission counter without transmission of an uplink transmission in response to the LBT failure and in response to the consistent LBT failure recovery functionality being supported and further in response to determining that the consistent LBT failure recovery procedure is configured.

19. The processor of claim 15, wherein the transmission counter comprises a preamble transmission counter when the transmission comprising the RACH preamble transmission.

20. The processor of claim 15, wherein the transmission counter comprises a SR transmission counter when the transmission comprises the SR transmission.

* * * * *